US006865212B2

(12) United States Patent
Kleinschmidt

(10) Patent No.: US 6,865,212 B2
(45) Date of Patent: Mar. 8, 2005

(54) METHOD FOR ENERGY CONTROL OF PULSED DRIVEN, GAS DISCHARGED-COUPLED BEAM SOURCES

(75) Inventor: Juergen Kleinschmidt, Weissenfels (DE)

(73) Assignee: Xtreme technologies GmbH, Jena (DE)

( * ) Notice: Subject to any disclaimer, the term of this patent is extended or adjusted under 35 U.S.C. 154(b) by 229 days.

(21) Appl. No.: 10/360,067

(22) Filed: Feb. 7, 2003

(65) Prior Publication Data

US 2003/0198263 A1 Oct. 23, 2003

(30) Foreign Application Priority Data

Feb. 26, 2002 (DE) .......................... 102 09 161

(51) Int. Cl.[7] .................................. H01S 3/22
(52) U.S. Cl. ............................ 372/57; 372/55
(58) Field of Search ........................... 372/55, 57

(56) References Cited

U.S. PATENT DOCUMENTS

| | | | |
|---|---|---|---|
| 5,450,436 A | 9/1995 | Mizoguchi et al. | ......... 372/59 |
| 5,586,134 A | 12/1996 | Das et al. | ......... 372/38 |
| 5,608,492 A * | 3/1997 | Sato | ......... 355/68 |
| 6,005,879 A * | 12/1999 | Sandstrom et al. | ......... 372/25 |
| 6,067,306 A * | 5/2000 | Sandstrom et al. | ...... 372/38.01 |
| 5,440,578 A | 10/2000 | Sandstrom | ......... 372/59 |
| 6,128,323 A | 10/2000 | Myers et al. | ......... 372/38 |
| 6,330,261 B1 | 12/2001 | Ishihara et al. | ......... 372/38.1 |
| 2003/0161362 A1 * | 8/2003 | Kleinschmidt | ......... 372/25 |
| 2004/0141182 A1 * | 7/2004 | Schroder et al. | ......... 356/454 |

OTHER PUBLICATIONS

Proceedings of SPIE vol. 3997 (2000) 126–135, t V. Banine et al. "The Relationship Between an EUV Source and the Performance of am EUV Lithographic System".

* cited by examiner

*Primary Examiner*—Don Wong
*Assistant Examiner*—Leith A Al-Nazer
(74) *Attorney, Agent, or Firm*—Reed Smith LLP

(57) ABSTRACT

The invention is directed to a method for energy regulation of pulsed-operation gas discharge-coupled radiation sources, particularly of excimer lasers, $F_2$ lasers and EUV radiation sources. The object of the invention is to find a novel possibility for energy regulation of pulsed-operation gas discharge-coupled radiation sources which permits a control of the charging voltage while taking into account the aging of gas discharge components (particularly of the work gas) without recalibration of the system. This object is met in that the pulse energy is measured for each individual pulse, at least the charging voltage is detected as influencing variable on the pulse energy for each individual pulse, the error of the current pulse energy is determined for that pulse in relation to a predetermined target value of the pulse energy, the set energy $E_S$, the mean square deviation from the set energy is calculated by time-average over a large quantity of pulses, and the pulse energy is controlled for every pulse by a proportional regulation of the charging voltage, wherein the proportional regulation is carried out with an adapted regulating factor which is determined by minimizing the mean square deviation of the current pulse energy.

5 Claims, 2 Drawing Sheets

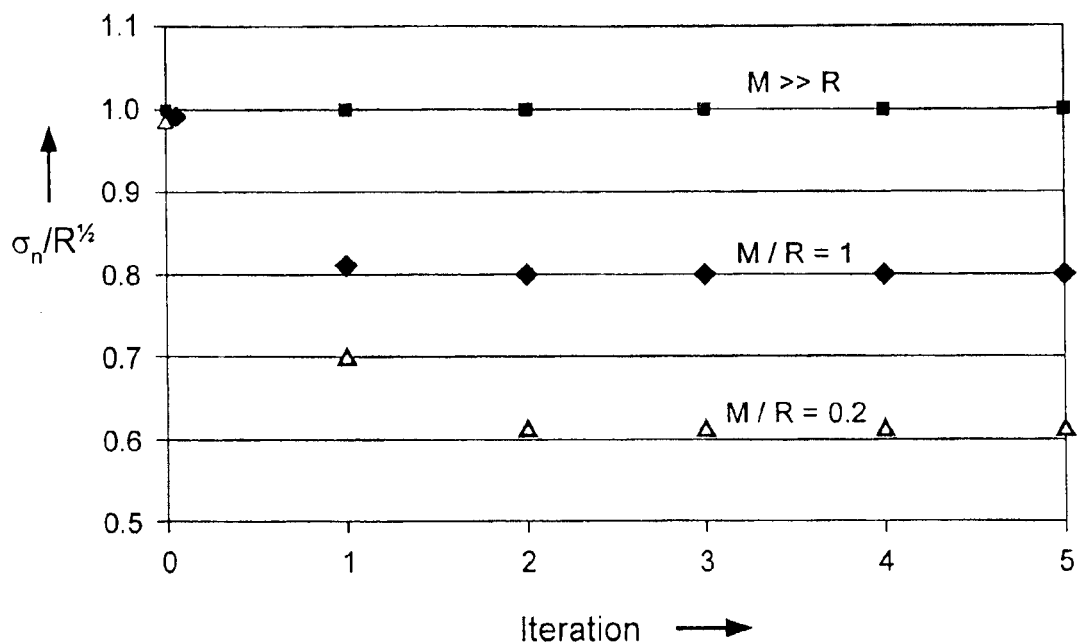
F I G. 1
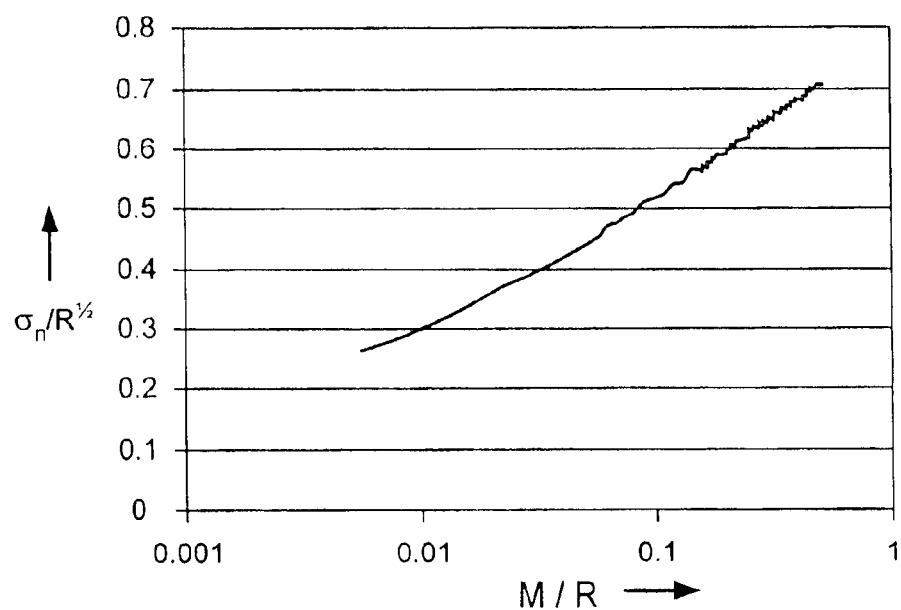
F I G. 2

METHOD FOR ENERGY CONTROL OF PULSED DRIVEN, GAS DISCHARGED-COUPLED BEAM SOURCES

CROSS-REFERENCE TO RELATED APPLICATIONS

This application claims priority of German Application No. 102 09 161.7, filed Feb. 26, 2002, the complete disclosure of which is hereby incorporated by reference.

BACKGROUND OF THE INVENTION a) Field of the Invention

The invention is directed to a method for energy regulation of pulsed gas discharge-coupled radiation sources, particularly of excimer lasers, $F_2$-lasers and EUV radiation sources based on a gas discharge. It is applied particularly in semiconductor lithography for chip fabrication.

b) Description of the Related Art

In addition to special lamps, narrowband excimer lasers with wavelengths of 248 nm and 193 nm are currently used as radiation sources for producing microchips. Scanners based on $F_2$ lasers (157 nm) are in development.

In all photolithography processes, a mask (containing the structure to be imaged) is imaged on the wafer in the scanner in a reduced manner (the reduction is typically 1:5). EUV lithography (at around 13.5 nm) appears to be the most promising variant for next-generation lithography.

Aside from the characteristics of the optical system (numerical aperture, depth of focus, aberrations or imaging errors of the lenses or mirrors), the image quality of the photolithographic process is essentially determined by how accurately the radiated radiation dose can be maintained. According to V. Banine et al. (Proc. SPIE Vol. 3997 (2000) 126), this dose stability (dose accuracy) is determined by:

a) pulse quantization
b) pulse-to-pulse stability
c) spatial stability of the emitting volume.

Pulse quantization is scanner-specific. The quantity of light pulses that can fall into the moving slit during a scan varies. However, this quantity can usually be ignored.

The quantities b and c are specific to the radiation sources themselves. Quantity c is significant only for EUV sources based on detectable fluctuations of the emitting plasma.

The requirements of the chip manufacturer with respect to dose stability (at the wafer site) place extremely high demands on pulse-to-pulse stability. This is expressed in the standard deviation σ of the actual light pulse energy from the average light pulse energy or from the target pulse energy value (set energy). For narrowband excimer lasers, DUV lithography and VUV lithography require σ-values of less than 1.5% and EUV lithography even requires σ-values of less than 0.4%.

These demands can only be met by means of pulse-to-pulse energy regulation. Pulse-to-pulse energy regulation for pulse train frequencies in the kHz range is only possible by means of a fast high-voltage regulation of the charging voltage U.

In control engineering, PID (proportional-integral-differential) controllers are used very often for controlling processes. PI (proportional-integral) regulation is somewhat simpler and, in many cases, more stable. PI regulation was also described in U.S. Pat. No. 6,005,879 for fast pulse energy control of narrowband excimer lasers. The charging voltage is regulated for the first 10 . . . 40 pulses in an exposure burst in a modified PI regulation which, however, retains the empirical regulation factors.

U.S. Pat. Nos. 5,440,578, 5,450,436 and 5,586,134 also disclose fast pulse control, but are directed to the interplay between the regulation of high-voltage and gas supply for pulse energy stabilization in excimer lasers rather than to the cyclical processing of measurement values.

A fast pulse regulation means controlling the pulse energy of every laser shot by controlled variation of the charging voltage. The algorithm of PI control commonly permits calculation of the charging voltage U for the pulse energy E of the light pulse n according to the following formula:

$$E_n = E_{n-1} + A(E_S - E_{n-1}) + BD_{n-1}, \quad (1)$$

where $$D_{n-1} = \sum_i (E_S - E_i), (i = 1 \ldots n-1),$$

where $E_S$ is a target value (the set energy, as it is called) and $D_{n-1}$ is the sum of the deviations of the preceding pulse energy values from the value of the set energy. $A(E_S - E_{n-1})$ is the proportional term of the PI regulation and $B D_{n-1}$ is the integral term.

In the technical literature pertaining to control and regulating engineering, A and B are designated as amplification constants. These are empirical values and are therefore to be determined experimentally.

As is described in U.S. Pat. No. 6,005,879, the charging voltage to be adjusted for the n-th pulse $$U_n = U_{n-1} - [A(E_S - E_{n-1}) + B D_{n-1}]/(dE/dU) \quad (2)$$

can be calculated from equation (1).

In this connection, dE/dU is a ratio of the change in the pulse energy of the excimer laser with variation of the charging voltage U, which ratio must be determined sequentially (at least once per burst) in order to be able to calculate with a moving average.

The disadvantage of the conventional algorithm consists in that A and B in equations (1) and (2) have fixed values which must be determined empirically at the start. However, the pulse statistics change over the gas life of an excimer laser and A and B must accordingly be optimized anew to minimum σ-values by trial and error. This involves extensive on-site measurements of the equipment by service engineers.

OBJECT AND SUMMARY OF THE INVENTION

The primary object of the invention is to find a novel possibility for energy regulation of pulsed-operation gas discharge-coupled radiation sources (regulation of pulse-to-pulse stability) which permits a control of the charging voltage while taking into account the aging of gas discharge components, particularly the aging of the work gas, without recalibration of the system.

According to the invention, this object is met in a method for energy regulation of pulsed-operation gas discharge-coupled radiation sources with excitation of a work gas and application of a high-voltage charging, particularly of excimer lasers, $F_2$ lasers and EUV radiation sources which generate a quasi-stationary pulse train, a so-called burst, in continuous operation by means of the following steps:

measurement of the pulse energy for each individual pulse, measurement of at least the charging voltage as influencing variable on the pulse energy for each individual pulse, determination of an error of the current pulse energy for that pulse in relation to a predetermined target value of the pulse energy, the set energy $E_S$, calculation of the mean square deviation from the set energy $E_S$ time-averaged over a large quantity of pulses, control of the pulse energy for every pulse by a proportional regulation of the charging voltage, wherein the proportional regulation is carried out with an adapted regulating factor which is determined by minimizing the mean square deviation of the current pulse energy.

The time averaging of the mean square deviation is advantageously carried out over a predetermined sequence of pulses, preferably over a burst of several score pulses to several hundred pulses.

The proportional regulation is advisably carried out while taking into account noncorrelated noise values, measurement errors m through noise in the measuring apparatus and adjusting errors r of the influencing variable according to the equation which will be described in more detail in the following:

$$E_n = (E_{n-1} + m_{n-1}) + a(E_S - (E_{n-1} + m_{n-1}) + r_n), \quad (4)$$

wherein unregulated operating mode is switched to occasionally, preferably between individual pulse sequences (in so-called burst pauses), in order to determine anew the noise values, particularly the adjusting error r. For this purpose, the mean square deviation is advantageously formed according to the following equation:

$$\sigma_n^2 = <(E_S - E_n)^2> = (<(E_S - E_{n-1})^2> + M)(1-a) + a^2 R, \quad (6)$$

where $M = <m_i\, m_i>$ and $R = <r_i\, r_i>$ are error squares of the noise values and the regulating factor a is determined in such a way, according to $(\partial \sigma_n^2/\partial a) = 0$, that the mean square deviation assumes a minimum.

For regulating the charging voltage, the regulating factor a is advisably adapted to the current operating state of the radiation source before every charging process according to the following equation:

$$a = [0.25(M/R)^2 + M/R]^{1/2}\, 0.5 M/R. \quad (9)$$

The fundamental idea of the invention is based on the idea that aging phenomena, particularly the aging of work gas, in gas discharge-coupled radiation sources impairs the pulse-to-pulse stability of the radiation source without being taken into account in conventional fast regulation of the charging voltage. Adaptation of the regulation factors (A and B) in PI regulation during operation of the radiation source is not feasible due to the expenditure on empirical measurements for recalibrating the system.

Therefore, by applying the least squares method, the invention makes use of a statistical evaluation of noncorrelated noise values such as adjusting errors of the influencing variables (charging voltage) and measurement errors of the regulating variable (pulse energy) in order to have a currently adapted regulation factor for proportional regulation before every pulse of the radiation source. The optimal regulating factor a according to equation (5) is determined by the ratio of the fluctuation square of the measurement noise to the fluctuation square of the "adjusting noise" without regulation. This means that during the operation of the radiation source it is necessary to switch to unregulated operation automatically from time to time (usually in the pauses between two pulse sequences, the burst pauses, as they are called, or other planned exposure pauses) and to carry out a measurement of the noise values in order to be able to adapt the regulation continuously to the current operating state of the radiation source.

By means of the method according to the invention, it is possible to regulate the pulse energy of pulsed-operation gas discharge-coupled radiation sources in such a way that the charging voltage is controlled while taking into account the aging of gas discharge components, particularly the aging of the work gas, before every pulse corresponding to the current operating state of the radiation source (without regular recalibration of the system) with a high pulse-to-pulse stability.

The invention will be described more fully in the following with reference to an embodiment example.

BRIEF DESCRIPTION OF THE DRAWINGS

In the drawings:

FIG. 1 shows the dependence of the value $\sigma_n/R^{1/2}$ on the quantity n of iteration steps for the examples $M \gg R$, $M = R$ and $M = 0.2\,R$;

FIG. 2 shows the dependence of the value $\sigma_n/R^{1/2}$ on the ratio of the error squares M/R;

DESCRIPTION OF THE PREFERRED EMBODIMENTS

Figure 3:
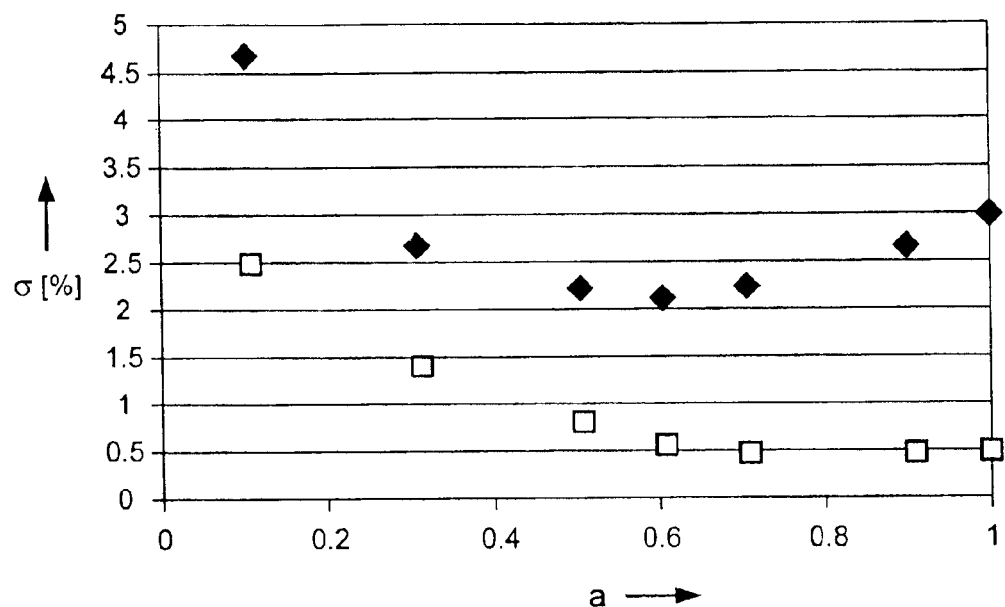
FIG. 3 shows the results of a simulated regulation for the standard deviation $\sigma$ and for $\sigma = f(MAV$ over 30 pulses) depending on the regulating factor a for $M/R = 1$.

The method according to the invention involves a simple regulating procedure for the pulse energy of pulsed-operation gas discharge-coupled radiation sources.

The method is based on the following:

the pulse energy is measured for each individual pulse, at least the charging voltage is detected as an influencing variable on the pulse energy for every individual pulse, the error of the current pulse energy for that pulse is determined in relation to a predetermined target value of the pulse energy, the set energy $E_S$, the mean square deviation from the set energy $E_S$ is calculated by time averaging over a large quantity of pulses, the pulse energy for every pulse is controlled by a proportional regulation of the charging voltage, wherein the proportional regulation is carried out with an adapted regulating factor which is determined by minimizing the mean square deviation of the current pulse energy.

The principal procedure is known as the method of least squares as applied, e.g., in regression analysis. The known Wiener filtering, which is used in signal processing with noisy signals for the best possible determination of the input signals, is likewise based on the method of least squares. Kalman filtering also uses the method of least squares for optimal prediction of the process sequences.

In applying this commonly used method, the square of the mean square deviation from a target value, the set energy $E_S$, is minimized according to the invention:

$$\sigma_n^2 = \langle (E_S - E_n)^2 \rangle \rightarrow \text{minimum}.$$

In the following example, without limiting the generality, the regulation of the pulse-to-pulse stability of an excimer laser as radiation source is described. The same prerequisites and regulation conditions also apply to other gas discharge-coupled radiation sources, particularly for EUV sources based on a gas discharge.

In this connection, the following equation is given:

$$E_n = E_{n-1} + a(E_S - E_{n-1}) \qquad (3)$$

which can be rewritten to show charging voltages according to equation (2) simply by multiplying by dE/dU.

The last radiated pulse energy $E_{n-1}$ is measured by a suitable energy monitor. Because of the noise of the measurement apparatus, the pulse energy $E_{n-1}$ is only measurable accurately to a measurement error m. Further, an adjusting error r occurs, for example, during the adjustment to the new voltage $U_n$.

Therefore, (3) is modified to:

$$E_n = (E_{n-1} + m_{n-1}) + a(E_S - (E_{n-1} + m_{n-1}) + r_n) \qquad (4)$$

In this connection, m, r are noncorrelated noise values and the following can be given for i≠k:

$$\langle m_i\, m_k \rangle = 0$$

$$\langle r_i\, r_k \rangle = 0$$

$$\langle m_i\, m_i \rangle = M \qquad (5)$$

$$\langle r_i\, r_i \rangle = R$$

$$\langle m_i\, r_k \rangle = 0$$

Using the preceding formulations, (4) gives:

$$\sigma_n^2 = (\sigma_{n-1}^2 + M)(1-a) + a^2 R, \text{ where } \sigma_n^2 = \langle (E_S - E_n)^2 \rangle \qquad (6)$$

The value a is selected in such a way that $$\sigma_n^2 = \langle (E_S - E_n)^2 \rangle$$

assumes a minimum, i.e., $$\left(\frac{\partial \sigma_n^2}{\partial a}\right) = 0.$$

This gives simple equations for determining the mean square deviation $$\sigma_n^2$$

and the regulating factor a:

$$\sigma_n^2 = R(\sigma_{n-1}^2 + M)/(\sigma_{n-1}^2 + M + R) \text{ and} \qquad (7)$$

$$a = \sigma_{n-1}^2 / R$$

Further, it is reasonable to assume that the standard deviation $\sigma_n^2$ can be set at the start of the iteration equal to the fluctuation square R of the adjusting error r, i.e., $$\sigma_n^2 = R = (\text{voltage noise of the network device} \times dE/dU)^2.$$

Starting from this initial value, it will be seen, as is shown in FIG. 1, that the standard deviation $\sigma_n$ (and consequently also the regulating factor a) passes into a stationary final value already after n=2 . . . 3 iterations. This was investigated for different orders of magnitude of the ratio of the noncorrelated noise values M and R and led to identical results qualitatively. In this connection, after individual iteration steps the calculation results shown quadratically in FIG. 1 represent the assumption that the error square R of the adjusting error r, of the "adjusting noise", is much greater than the error square of the measurement noise m. As calculation results, the diamonds show the ratio of M/R=1 and the triangles show a ratio M/R=0.2.

The final value of the standard deviation $\sigma^2$ accordingly gives $$\sigma^2 = (0.25\, M^2 + R\, M)^{1/2} - 0.5\, M \qquad (8)$$

and is only still dependent on the fluctuation squares M of the measurement error m of the measurement of the pulse energy $E_{n-1}$ and the fluctuation squares R of the adjusting error r during the adjustment of the new charging voltage $U_n$.

FIG. 2 shows the dependence of the standard deviation, shown as $\sigma/R^{1/2}$, on the ratio M/R of the fluctuation squares of the noise values. These σ-values are the minimum that can be reached with the regulation. The following equation is given for the regulating factor a:

$$a = \{0.25(M/R)^2 + M/R\}^{1/2}\, 0.5\, M/R. \qquad (9)$$

According to equation (9), the optimal regulating factor a is determined by the ratio of the fluctuation square M of the measurement noise to the fluctuation square R of the "adjusting noise" without regulation. Therefore, it is necessary while operating the excimer laser to switch occasionally to unregulated operation and to determine the fluctuation square R of the adjusting error r. Provided the fluctuation square M of the adjusting error m of the charging voltage U is not dependent on the gas state of the radiation source, the regulating factor a can be updated continuously. The excimer laser is operated in unregulated normal mode with closed shutter or with the intermediary of a light trap. A plurality of pulses, preferably within the scope of at least one burst conventional for the purpose of use, is released for suitable averaging. How often unregulated operation is switched to depends on the given possibilities (pauses) in the case of application. However, it has proven advisable to switch to unregulated operation after about a million (regulated) pulses and to use about one thousand pulses (possibly divided into several bursts) for averaging the measured noise values.

Figure 4:
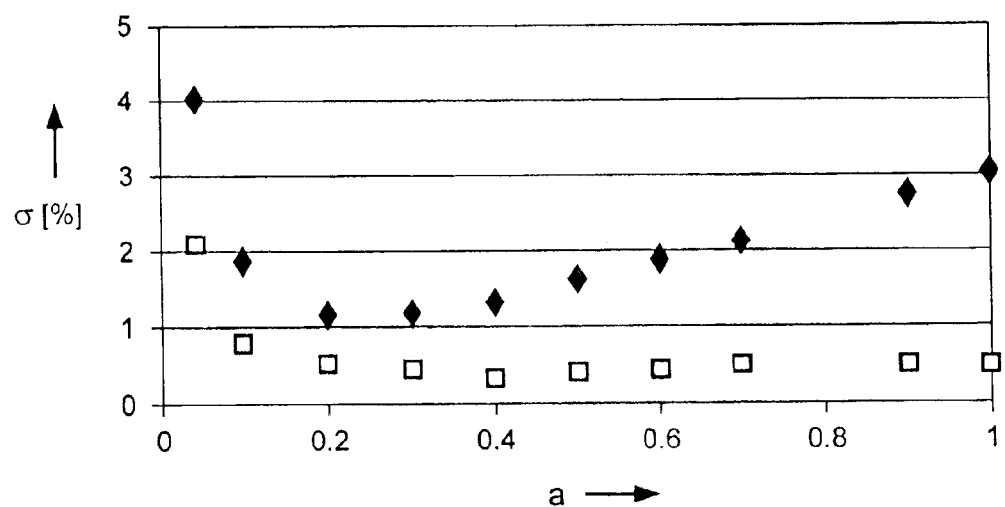
FIG. 4 shows the results of a simulated regulation for the standard deviation $\sigma$ and for $\sigma = f(MAV$ over 30 pulses) depending on the regulating factor a for $M/R = 0.1$.

The behavior of the regulation was tested in a simulation. For this purpose, the set energy $E_S$=10 mJ was determined and equally distributed random numbers −0.5≦r≦+0.5 mJ were drawn for the adjusting noise r. FIGS. 3 and 4 show the σ-values resulting from the simulation and the σ-values of the moving average (MAV) over 30 pulses as a function of the regulating factor a for different ratios of the fluctuation squares M/R=1 (FIG. 3) and M/R=0.1 (FIG. 4).

A minimum for a determined value of the regulating factor a is obtained for σ. Precisely this minimum is adjusted with the regulating procedure. At the same time, the MAV is a technically important value. It is the average radiation dose which passes through the moving slit of the scanner of a lithography machine for chip fabrication and which is adjusted to a stationary final value by the present regulation procedure. The demand of chip manufacturers for higher dose accuracy during lithographic exposure of the wafer can be met in this way.

Other design variants of the invention are possible without departing from the framework of this invention. In the example described above, the pulse energy of an excimer laser was regulated by controlling the charging voltage based on the current pulse energy of the radiation source, wherein the current operating state of the radiation source was taken into account by an adapted regulation factor. Even when not mentioned expressly, any other gas discharge-based, pulsed-operation radiation source is also clearly understood as belonging to the inventive teaching insofar as the proportional regulation according to the invention with adapted regulating factor can be applied to its gas discharge statistics without inventive activity and a like statistical handling of the measurement variables (regulating values and adjusting values) is made use of while taking into account its error squares interpreted as a noise component, so that a continuous adaptation of the regulation factor is possible.

While the foregoing description and drawings represent the present invention, it will be obvious to those skilled in the art that various changes may be made therein without departing from the true spirit and scope of the present invention.

What is claimed is:

1. A method for energy regulation of pulsed-operation gas discharge-coupled radiation sources with excitation of a work gas and application of a high-voltage charging, particularly of excimer lasers, $F_2$ lasers and EUV radiation sources which generate a quasi-stationary pulse train, a so-called burst, in continuous operation comprising the following steps:

measuring the pulse energy for each individual pulse;

measuring at least the charging voltage as influencing variable on the pulse energy for each individual pulse;

determining an error of the current pulse energy for that pulse in relation to a predetermined target value of the pulse energy, the set energy $E_S$, calculating the mean square deviation from the set energy $E_S$ time-averaged over a large quantity of pulses; and controlling the pulse energy for every pulse by a proportional regulation of the charging voltage, wherein the proportional regulation is carried out with an adapted regulating factor which is determined by minimizing the mean square deviation of the current pulse energy.

2. The method according to claim 1, wherein the time averaging of the mean square deviation is carried out over a given sequence of pulses, particularly over a burst of several hundred pulses.

3. The method according to claim 1, wherein the proportional regulation is carried out while taking into account noncorrelated noise values, measurement errors m of the regulating value, and adjusting errors r of the influencing variables according to the following equation:

$$E_n = (E_{n-1} + m_{n-1}) + a(E_S - (E_{n-1} + m_{n-1}) + r_n).$$

4. The method according to claim 3, wherein the proportional regulation is carried out by minimizing the mean square deviation $$\sigma_n^2 = <(E_S - E_n)^2> = (<(E_S - E_{n-1})^2> + M)(1-a) + a^2 R,$$

where $M = <m_i\, m_i>$ and $R = <r_i\, r_i>$ are error squares of the noise values according to $$\left(\frac{\partial \sigma_n^2}{\partial a}\right) = 0,$$

and the regulating factor a is always adapted to the value for which the mean square deviation is minimal.

5. The method according to claim 4, wherein the regulating factor a is adapted to the current operating state of the radiation source before every pulse according to the following equation:

$$a = [0.25(M/R)^2 + M/R]^{1/2} 0.5 M/R.$$

* * * * *

UNITED STATES PATENT AND TRADEMARK OFFICE
CERTIFICATE OF CORRECTION

PATENT NO. : 6,865,212 B2
DATED : March 8, 2005
INVENTOR(S) : Juergen Kleinschmidt It is certified that error appears in the above-identified patent and that said Letters Patent is hereby corrected as shown below:

<u>Title page,</u>
Item [73], Assignee, should read:
-- [73] Assignee: XTREME technologies GmbH --

Signed and Sealed this

Twenty-eighth Day of June, 2005

JON W. DUDAS
*Director of the United States Patent and Trademark Office*